US006212413B1

(12) United States Patent
Kiesi

(10) Patent No.: US 6,212,413 B1

(45) Date of Patent: Apr. 3, 2001

(54) MULTI-FILAR HELIX ANTENNAE FOR MOBILE COMMUNICATION DEVICES

(75) Inventor: Kari Kalle-Petteri Kiesi, Espoo (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/193,554

(22) Filed: Nov. 17, 1998

(30) Foreign Application Priority Data

Nov. 27, 1997 (FI) .................................................... 974350

(51) Int. Cl.[7] ..................................................... H04B 1/38

(52) U.S. Cl. ........................... 455/575; 455/90; 455/550; 343/895

(58) Field of Search .................................... 343/702, 700, 343/895; 455/550, 575, 90

(56) References Cited

U.S. PATENT DOCUMENTS

| | | | | |
|---|---|---|---|---|
| 4,998,078 | | 3/1991 | Hulkko | 333/109 |
| 5,191,352 | | 3/1993 | Branson | 343/895 |
| 5,276,920 | | 1/1994 | Kuisma | 455/101 |
| 5,341,149 | | 8/1994 | Valimaa et al. | 343/895 |
| 5,450,093 | | 9/1995 | Kim | 343/895 |
| 5,561,439 | | 10/1996 | Moilanen | 343/846 |
| 5,627,550 | | 5/1997 | Sanad | 343/700 MS |
| 5,634,203 | * | 5/1997 | Ghaem | 455/134 |
| 5,657,028 | | 8/1997 | Sanad | 343/700 MS |
| 5,680,144 | | 10/1997 | Sanad | 343/700 MS |
| 6,025,816 | * | 2/2000 | Dent et al. | 343/895 |
| 6,122,524 | * | 9/2000 | Goerke | 455/552 |
| 6,150,984 | * | 11/2000 | Suguro et al. | 343/702 |

FOREIGN PATENT DOCUMENTS 0 694 985 A1 1/1996 (EP) .

* cited by examiner

*Primary Examiner*—Curtis Kuntz
*Assistant Examiner*—Barry W. Taylor
(74) *Attorney, Agent, or Firm*—Perman & Green, LLP

(57) ABSTRACT

A satellite telephone has a quadrifilar helix (QFH) antenna (1) having four inter-wound helical antenna elements (2). The antenna (1) can be rotated between a first extended position and a second folded position. A phase shifting arrangement (10) is coupled to the helical elements (2) for applying a first set of relative phase shifts (0,90,180,270 degrees) to signals applied to or received from the helical (2) elements when the antenna (1) is in said first position, and for applying a second set of relative phase shifts (0,270,180, 90) when the antenna (1) is in the folded position. The antenna (1) is thus switched between end-fire and back-fire modes, optimising the spatial gain pattern of the antenna for both the extended and folded positions of the antenna (1).

15 Claims, 3 Drawing Sheets

MULTI-FILAR HELIX ANTENNAE FOR MOBILE COMMUNICATION DEVICES

FIELD OF THE INVENTION

The present invention relates to mobile communication devices having multi-filar helix antennae.

BACKGROUND OF THE INVENTION

In recent years there has been a rapid growth in the ownership and use of mobile cellular telephones. However, a limitation of cellular telephones remains the restricted geographical coverage provided by cellular networks. For example, remote, sparsely populated areas may either suffer from very poor quality coverage or no coverage at all. This has led to the implementation of satellite telephone networks such as INMARSAT™ where a mobile telephone communicates directly with an overhead satellite, the satellite relaying signals to and from some fixed position earth station. It is likely that demand for satellite telephone services will increase providing that mobile terminals can be made small enough to be attractive to users.

The demands placed upon the radio transmitting and receiving components of a mobile telephone are extremely high in the case of satellite telephone systems. This applies especially to the antenna. It is envisaged that the antenna of choice for satellite telephones will be the quadrifilar helix (QFH) antenna (K. Fujimoto and J. K. James, "Mobile Antenna Systems Handbook", Norwood, 1994, Artech House, pp. 455, 457). A QFH antenna 1 is illustrated in FIG. 1 and comprises four inter-wound resonant helical antenna elements 2*a* to 2*d*. The elements are arranged around a common axis A with starting points 3*a* to 3*d* respectively, offset from one another by 90 degrees and short circuited together (by short circuit connector 4) at the top of the antenna 1. In a receiving mode, signals received by the helical elements 2*b* to 2*d* are phase shifted, relative to the signal applied to the first helical element 2*a*, by 90, 180, and 270 degrees prior to combining the signals. Phase shifting may be achieved, for example, using baluns as described in U.S. Pat. No. 5,450,093. When the antenna is used in a transmitting mode, this process is reversed, with a signal to be transmitted being split into four identical components, which components are then phase shifted prior to application to respective helical elements 2*a* to 2*d*.

FIG. 2 shows in axial cross-section the spatial gain pattern of a typical QFH antenna, where the axis A coincides with the longitudinal axis of the QFH antenna 1 of FIG. 1. This pattern can be thought of either as the radiating strength of the antenna in the transmitting mode or the sensitivity of the antenna in the receiving mode. The gain pattern of FIG. 2 corresponds to right circularly polarised signals, given that the helical elements 2*a* to 2*d* are left handed helices. If the helical elements are right handed helices, then the gain pattern of FIG. 2 would apply to left circularly polarised signals.

It is apparent that the gain of the QFH antenna is concentrated in the upper axial direction (as viewed in FIG. 1) as a main frontal lobe 5 which is generally hemispherical in shape. Only a small backward lobe 6 is present. The spatial gain characteristic of the QFH antenna is ideal for satellite telephones which must communicate with satellites in or passing across a hemispherical (or dome-shaped) region above the earth.

One drawback of the QFH antenna is its relatively large size. A typical QFH antenna may be ten centimetres long and has a diameter of two centimetres, the same order as the dimensions of a typical satellite telephone. In practice, where the antenna projects from the top of the telephone, the antenna can double the total length of the phone. In order to improve the portability of satellite telephones having QFH antenna, it is therefore desirable to be able to fold away the antenna when the phone is not in use. A folding antenna of this type is disclosed in EP0694985 where the antenna is coupled to the phone by a rotatable joint.

A satellite telephone 7 having a foldable antenna 1 is illustrated in FIG. 3, where FIG. 3A shows the antenna 1 in its extended position and FIG. 3B shows the antenna 1 in its folded position. When extended, and as has been described above, the spatial gain pattern of the antenna is optimised for communicating with an overhead satellite. However, this is not the case when the antenna is folded away and where the frontal lobe 5 of the gain pattern is directed towards the ground (at least when the phone is in the upright position). Whilst it may not be necessary to transmit signals from the satellite telephone to a satellite with the antenna 1 in this position, it will generally be necessary for the telephone to receive paging signals from a satellite so that the telephone can be alerted to incoming calls. However, the gain afforded by the backward lobe of the QFH antenna is unlikely to be sufficient to allow for this purpose when the antenna is folded away, even if, as may be the case, paging signals are transmitted at a higher power level than other satellite originating signals.

It has been proposed to overcome this problem by providing a second paging antenna in addition to the main QFH antenna. This additional antenna would be smaller than the QFH antenna but would be arranged such that its gain is always optimised for satellite communication. Whilst the gain of the antenna would not necessarily be sufficient to allow transmissions from the telephone to a satellite, it would be sufficient to allow the telephone to receive paging signals. This solution is undesirable however because it both increases the cost and the size of the telephone.

SUMMARY OF THE INVENTION

It is an object of the present invention to overcome or at least mitigate the disadvantages of known satellite telephones. In particular, it is an object of the present invention to provide a satellite telephone having an antenna which can be moved from an extended to a folded position but which provides for satisfactory reception of incoming signals in either position.

This and other objects are achieved by taking advantage of the ability to control the spatial gain pattern of a multi-filar helix antenna using the relative phasing of signals applied to or received from the individual helical elements.

According to a first aspect of the present invention there is provided a mobile communication device comprising:

- a multi-filar helix antenna having a plurality of inter-wound helical antenna elements, the antenna being rotatable between a first extended position and a second folded position; and
- a phase shifting arrangement coupled to said helical elements for producing a first set of relative phase shifts between signals applied to or received from the antenna elements when the antenna is in said first position, the phase shifting arrangement being responsive to movement of the antenna from said first to said second position to change said first set of phase shifts to a different, second set of phase shifts.

The present invention makes it possible to optimise the spatial gain characteristics of a multi-filar helix antenna in both the extended and folded positions of the antenna.

In one embodiment of the present invention, the communication device comprises detection means coupled to the antenna for detecting when the antenna is rotated between said first and second positions and for providing an electrical signal indicative of said movement to the phase shifting arrangement. The phase shifting arrangement applies either said first or said second set of phase shifts in dependence upon said signal.

In an alternative embodiment of the present invention, the phase shifting arrangement comprises a mechanical switching arrangement which is arranged to be moved between first and second switching positions by rotation of the antenna between its first and second positions. In said first switching position, said first set of phase shifts are applied and in said second switching position said second set of phase shifts are applied.

The device may comprise a rotatable joint coupling the antenna to a main housing of the communication device so that the antenna can be rotated between said first and second positions, the axis of rotation of said joint being substantially perpendicular to a longitudinal axis of the device.

Preferably, the antenna is a quadrifilar helix antenna having four inter-wound helical elements offset from one another by 90 degrees around the longitudinal axis of the antenna. Said first set of relative phase shifts may be 0, 90, 180, and 270 degrees applied in sequence to the elements around said axis. The second set of relative phase shifts may be 0, 270, 180, and 90 degrees applied to the elements in the same sequence. However, it will be appreciated that other relative phase shifts may be used particularly where the offset of the elements around the axis of the antenna differs from the above, regularly spaced, example. The helical elements may be left hand or right hand wound.

The change between the first and second sets of relative phase shifts may be achieved by providing switchable phase shifting circuits in series with those antenna elements which require to have their phases shifted, e.g. the second and fourth elements. These switching circuits may be controlled, for example, by the electrical signal generated by the detecting means described above.

The phase switching arrangement may be arranged, after initially changing said first set of phase shifts to said second set of phase shifts, to alternately apply the first and second sets of phase shifts to the helical elements. The antenna will thus be switched back and forward between the end-fire and back-fire modes. It will be appreciated that the device may not always be held in the "upright" position and that by switching between firing modes at regular intervals paging signals broadcast to the device may be detected regardless of the orientation of the device.

The present invention is not only applicable to quadrifilar helix antennae but is applicable to multi-filar helix antennae in general. For example, the present invention may be applied to bi-filar helix antennae.

The present invention is applicable in particular to satellite telephones. However, it is also applicable to other satellite communication devices including, for example, global positioning system (GPS) receivers. The invention is also applicable to other, non-satellite radio communication systems.

According to a second aspect of the present invention, there is provided a method of operating a mobile communication device having a multi-filar helical antenna with a plurality of inter-wound helical elements, the method comprising applying a first set of relative phase shifts to signals applied to or received from the antenna elements when the antenna is in an extended position and, in response to rotation of the antenna from the extended position to a folded position, substituting said first set of relative phase shifts for a second set of relative phase shifts.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
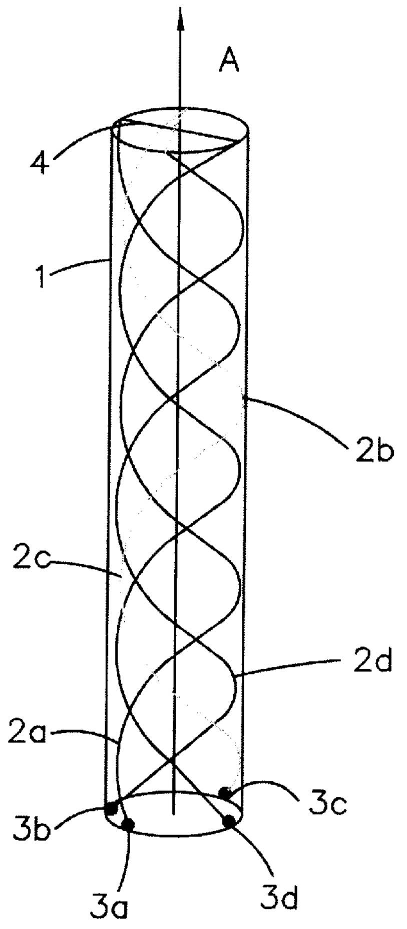
FIG. 1 illustrates a quadrifilar helix antenna.
Figure 2:
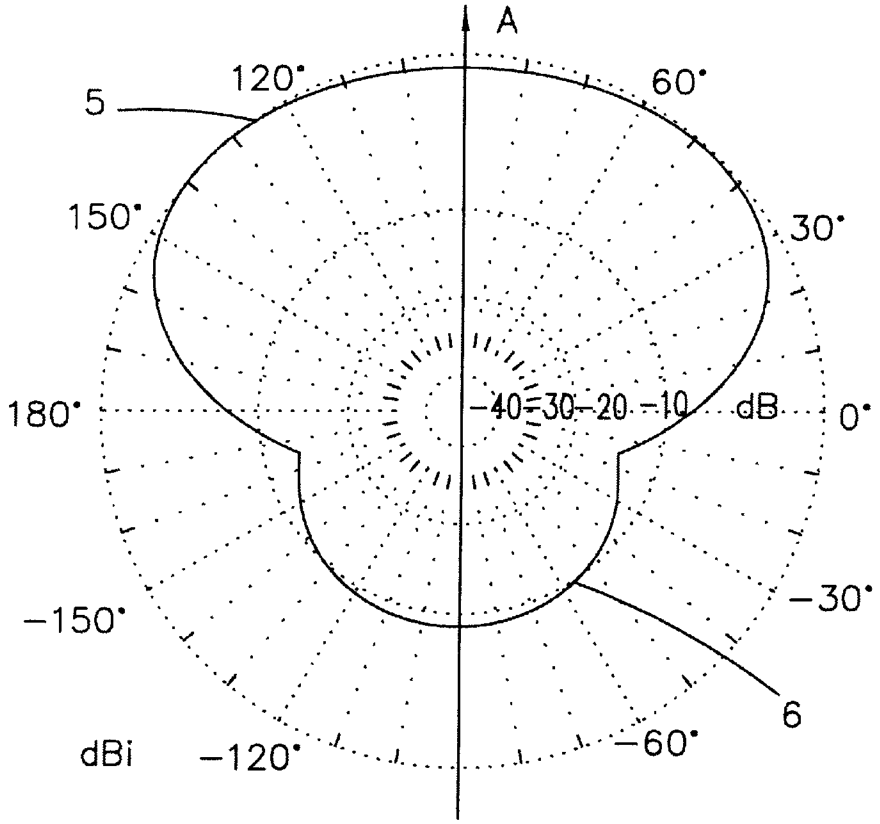
FIG. 2 shows an axial cross-section through the spatial gain pattern of the quadrifilar helix antenna of FIG. 1.

As has already been described, a quadrifilar helix antenna of the type shown in FIG. 1 provides a spatial gain pattern as shown in FIG. 2. This antenna arrangement, where the gain is concentrated at the top of the antenna, is known as "end-firing". It is known ("Multielement, Fractional Turn Helices", C. C. Kilgus, IEEE Transactions on Antennas and Propagation, July 1968, pp 499–500; and U.S. Pat. No. 5,191,352) that a QFH antenna having the same physical structure as that of FIG. 1 may be operated in a "back-fire" mode by swapping the phasing of two of the antenna elements (physically spaced apart by 180 degrees). For example, the phasing of the second and fourth elements 2*b*, 2*d* may be changed from 90 degrees and 270 degrees respectively to 270 degrees and 90 degrees respectively. The gain pattern of the QFH antenna in back-fire mode is inverted relative to that in the end-fire mode, i.e. in the former, the frontal lobe 5 projects out from the base of the antenna.

Figure 4:
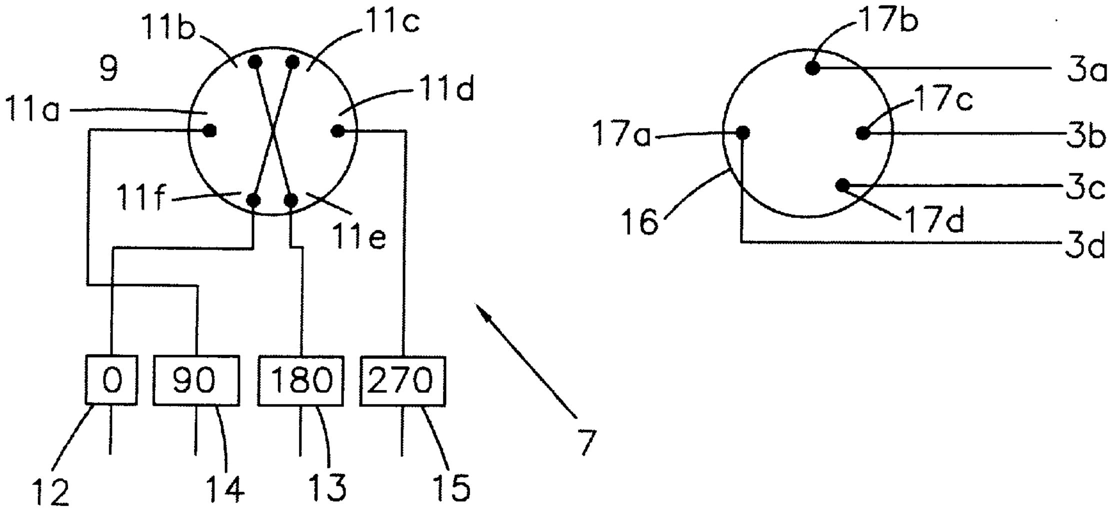
FIG. 4 shows a block diagram of a phase control arrangement for a quadrifilar helix antenna of the type shown in FIG. 1.

There is illustrated in FIG. 4 a phase control arrangement 8 for controlling the relative phase shifts of the signals received from and applied to the starting points 3*a* to 3*d* of the four helical elements 2*a* to 2*d* of a QFH antenna 1 of the type shown in FIG. 1. Shown on the left hand side of FIG. 4 is one, fixed, part 9 of a rotatable joint 10, which part is provided on one side of the main body of the satellite telephone 7. The joint part 9 has six electrical contacts 11*a* to 11*f* around its outer periphery. A first pair of contacts 11*c*,11*f* are connected together and to a coupling circuit 12 which introduces a 0 degree phase shift into signals received from or applied to the contacts. A second pair of contacts 11*b*, 11*e* are also connected together and to a 180 degree phase shifting coupling circuit 13. The two remaining contacts 11*a*, 11*d* are coupled to 90 and 270 degree phase shifting coupling circuits 14,15 respectively.

Shown on the right hand side of FIG. 4 is a second part 16 of the rotatable joint 10, which part 16 is fixed to the antenna 1 whilst being rotatably coupled to the first part 9 of the joint 10. The joint part 16 is arranged to rotate from the position shown in FIG. 4, in a clockwise direction, by 180 degrees allowing movement of the antenna 1 from an extended position to a folded position (see FIG. 3). The joint part 16 has on its outer surface four electrical contacts 17*a* to 17*d*. These contacts 17 are connected to the starting points 3*a* to 3*d* of respective helical elements 2*a* to 2*d*.

Figure 3A:
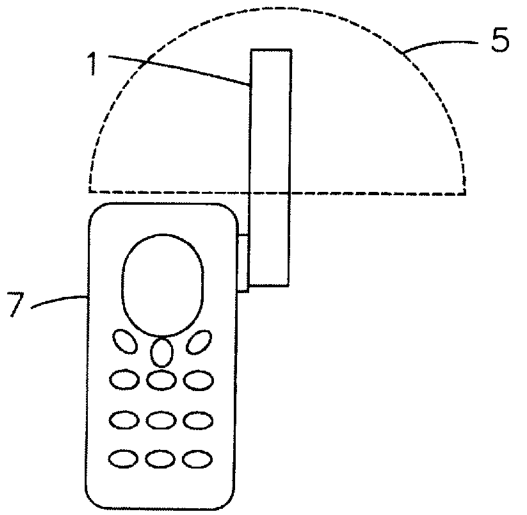
FIG. 3A illustrates a satellite telephone with a quadrifilar helix antenna in an extended position and with the antenna end-firing.
Figure 3B:
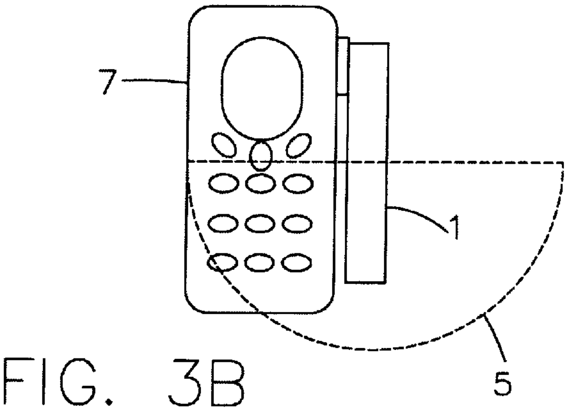
FIG. 3B shows the satellite telephone of FIG. 3A with the antenna rotated to a folded position.

With the joint 10 assembled from the two parts 9,16, the antenna part 16 overlies the body part 9. More particularly, in the position shown in FIG. 4 (i.e. with the antenna in the extended position), contact 17*a* is in contact with contact 11*a*, contact 17*b* with contact 11*c*, contact 17*c* with contact 11*d*, and contact 17*d* with contact 11*e*. Hence helical element starting points 3*a* to 3*d* are connected to 0, 90, 180, 270 degree phase shifting coupling circuits 12 to 15 respectively and the antenna 1 operates in an end-firing mode (FIG. 3A).

Figure 5:
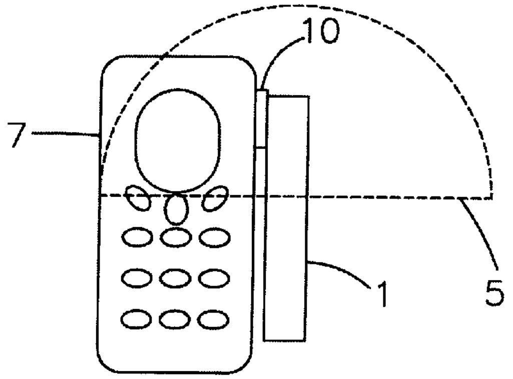
FIG. 5 illustrates a satellite telephone with a quadrifilar helix antenna in a folded position, where the antenna is back-firing.

Rotation of the antenna 1 from the extended position to the folded position causes rotation of the antenna part 16 by 180 degrees in a clockwise direction. This results in contact 17*a* making contact with contact 11*d*, contact 17*b* with contact 11*f*, contact 17*c* with contact 11*a*, and contact 17*d* with contact 11*b*. Hence helical element starting points 3*a* to 3*d* are now connected respectively to the 0, 270, 180, and 90 degree phase shifting coupling circuits 12 to 15 and the antenna 1 operates in a back-firing mode. As has been described above, the main lobe 6 of the antenna gain pattern now projects from the base of the antenna 1. However, as the antenna 1 has been turned upside down by rotation, the main lobe 6 continues to be directed upwardly as shown in FIG. 5.

Figure 6:
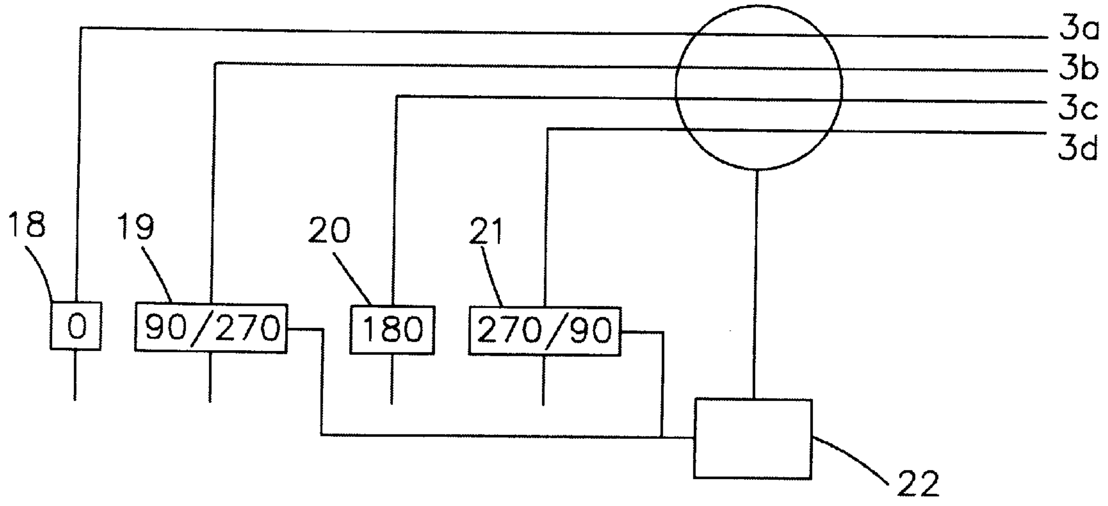
FIG. 6 shows a block diagram of an alternative phase control arrangement.

Normally a mobile telephone is carried in the upright position both in use and in storage (e.g. on a belt clip or in a jacket pocket). However, where the phone is likely to be stored in another orientation, e.g. upside down, it may be advantageous to alternate the operating mode of the antenna between end-firing and back-firing when the antenna is in the folded position. The alternating period may be, for example, in the region of one second, sufficient to enable the phone to detect a paging signal. This embodiment of the invention requires electronic switching of the phase shifts applied to the antenna signals and is illustrated in FIG. 6.

Four phase shifting coupling circuits 18 to 21 couple signals to and from the rotatable joint 10. However, contrary to the arrangement described above, the circuits are coupled to the same respective helical element starting points 3*a* to 3*d* regardless of the rotational position of the joint 10 or antenna 1. Phase switching for the second and third helical elements 2*b*,2*d* is provided by electronic switching within the phase shifting coupling circuits 19,21. A detecting circuit 22 detects the position of the antenna 1, either extended or folded, and applies a control signal to these coupling circuits 19,21. When the antenna 1 is the extended, the phase shifts are fixed so that the antenna operates in the end-fire mode. When the antenna is folded, the phase shifts alternate so that the antenna alternates between back-fire and end-fire modes.

It is noted that when the antenna is in the folded position, the telephone is normally only receiving signals (e.g. paging signals) and is not transmitting signals. Thus, in certain embodiments of the present invention, phase switching may only be applied in the receiving path of the radio frequency (RF) unit of the telephone, and not in the transmitting path. Moreover, the power rating of phase shifting components used only in the receiving path may be lower than those used in the transmitting path.

It will be appreciated by the skilled person that modifications may be made to the above described embodiment without departing from the scope of the present invention. For example, in the extended position, the antenna need not be aligned with the longitudinal axis of the phone. The antenna may be angled with respect to the phone such that the antenna extends substantially vertically when the phone is tilted by a user to align the earphone with the user's ear and the microphone with his mouth. The antenna may also be angled so that it extends vertically when the phone is laid flat on a horizontal surface. This may be appropriate when the phone is used in a hands free mode or when the phone is transmitting data, e.g. from a laptop computer.

What is claimed is:

1. A mobile communication device comprising:

a multi-filar helix antenna having a plurality of inter-wound helical antenna elements, the antenna being rotatable between a first extended position and a second folded position; and a phase shifting arrangement coupled to said helical elements for producing a first set of relative phase shifts between signals applied to or received from the helical elements when the antenna is in said first position, the phase shifting arrangement being responsive to movement of the antenna from said first to said second position to change said first set of phase shifts to a different, second set of phase shifts.

2. A device according to claim 1 and comprising detection means coupled to the antenna for detecting when the antenna is rotated between said first and second positions and for providing an electrical signal indicative of said movement to the phase shifting arrangement, said phase shifting arrangement being arranged to apply either said first or said second set of phase shifts in dependence upon said signal.

3. A device according to claim 1, wherein the phase shifting arrangement comprises a physical switch which is arranged to be moved between first and second switching positions by movement of the antenna between its first and second positions, and wherein in said first switching position, said first set of phase shifts are applied and in said second switching position said second set of phase shifts are applied.

4. A device according to claim 1, and further comprising a rotatable joint coupling the antenna to a main housing of the communication device so that the antenna can be rotated between said first and second positions.

5. A device according to claim 4, wherein the axis of rotation of said joint is substantially perpendicular to a longitudinal axis of the device.

6. A device according to claim 1, wherein the antenna is a quadrifilar helix antenna having four inter-wound helical elements offset from one another by 90 degrees around the longitudinal axis of the antenna.

7. A device according to claim 6, wherein said first set of relative phase shifts is 0, 90, 180, and 270 degrees applied in sequence to the elements around said axis and said second set of relative phase shifts is 0, 270, 180, and 90 degrees applied to the elements in the same sequence.

8. A device according to claim 1, wherein the change between the first and second sets of relative phase shifts is achieved by providing switchable phase shifting circuits in series with those antenna elements which require to have their phases shifted.

9. A device according to claim 1, wherein the phase switching arrangement is arranged, after initially changing said first set of phase shifts to said second set of phase shifts, to alternately apply the first and second sets of phase shifts to the helical elements to switch the antenna back and forward between end-fire and back-fire modes.

10. A device according to claim 1 and being arranged to provide telephonic communication via satellite.

11. A method of operating a mobile communication device having a multi-filar helical antenna with a plurality of inter-wound helical elements, the method comprising applying a first set of relative phase shifts to signals applied to or received from the antenna elements when the antenna is in an extended position and, in response to rotation of the antenna from the extended position to a folded position, substituting for said first set of relative phase shifts a second set of relative phase shifts.

12. A mobile communication device comprising:

a multi-filar antenna having a plurality of inter-wound antenna elements, the antenna being rotatable about the device between a first position and a second position;

a phase shifting arrangement coupled to said plurality of antenna elements for producing a set of relative phase shifts among signals coupled with respective ones of the antenna elements of said plurality of antenna elements via a first coupling arrangement or a second coupling arrangement; and selection means responsive to the position of the antenna relative to the device to provide the first coupling arrangement when the antenna is in the first position and the second coupling arrangement when the antenna is in the second position to establish a radiation pattern of the antenna relative to the device substantially independent of the antenna position.

13. A device according to claim 12, wherein said antenna is a helical antenna, said first position provides for an extension of the antenna from the device, and said second position provides for a retraction of the antenna to the device.

14. A device according to claim 13 wherein said selection means comprises a rotary switch having a first set of contacts on the device and a second set of contacts on the antenna, and wherein a rotation of said antenna relative to said device alters an arrangement of connections between the first and the second set of contacts.

15. A device according to claim 13 wherein said selection means comprises a detector of the position of said antenna, and means responsive to a signal outputted by said detector for altering phase shifts of said phase shifting arrangement to accomplish said first coupling arrangement when the antenna is in the first position and said second coupling arrangement when the antenna is in the second position.

* * * * *